Patented June 13, 1939

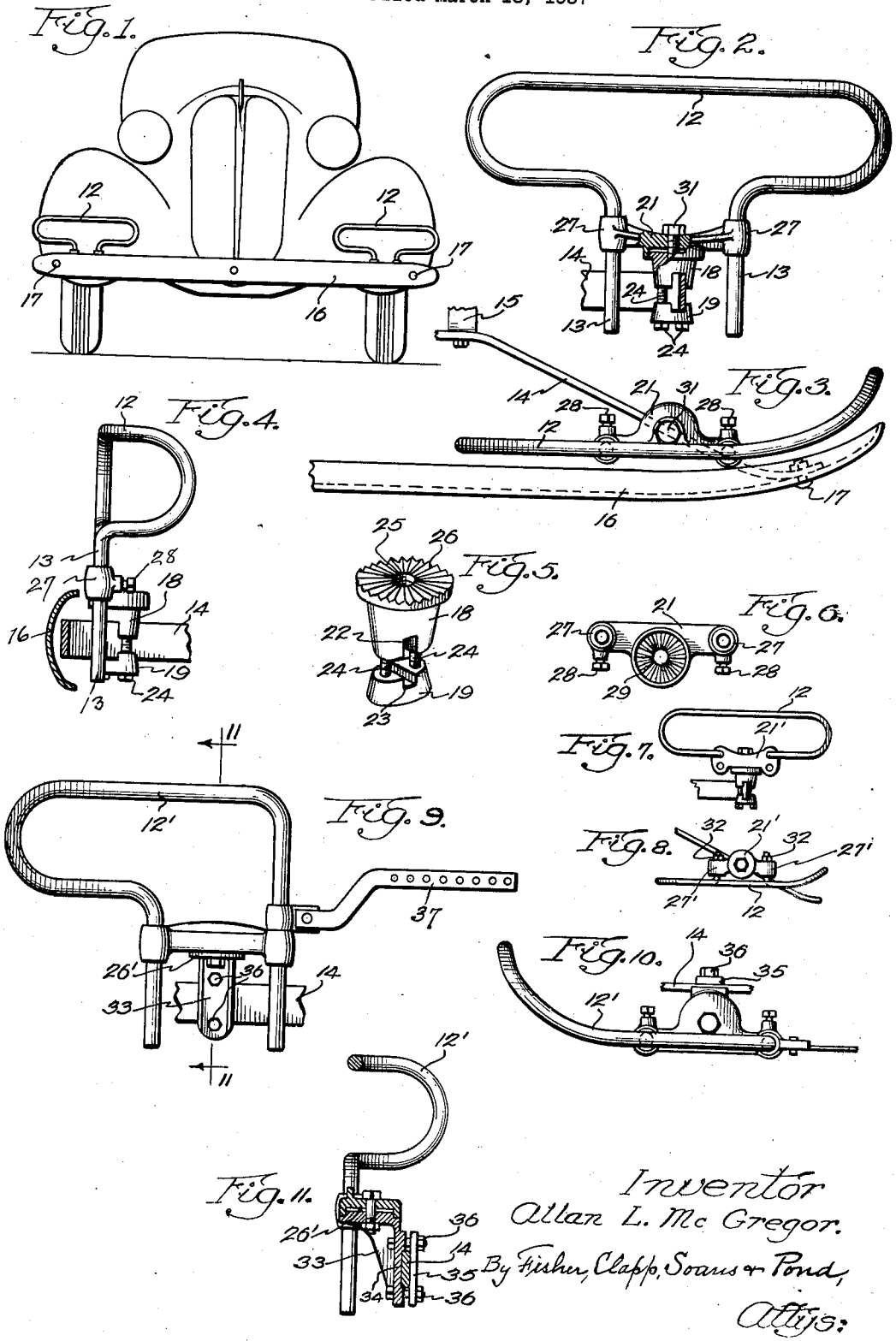

2,162,099

UNITED STATES PATENT OFFICE 2,162,099

AUTOMOBILE PROTECTIVE DEVICE

Allan L. McGregor, Chicago, Ill.

Application March 18, 1937, Serial No. 131,550

6 Claims. (Cl. 293—55)

This invention relates to a class of automobile accessories designed to protect exposed parts of an automobile from injury by collision. The customary front and rear bumper bars serve this purpose to a limited extent, and to prevent the front bumper of one car from inter-hooking with the rear bumper of another car a practice has arisen of mounting on and crosswise of the bumper bars vertical fender members projecting above and in some cases also below the bumper bar to a sufficient extent to prevent one bar from over-riding or under-riding the other, which frequently results in an inter-hooked engagement of one bar with one end of the other, necessitating the jacking up of the front or rear end of one car to free the bars from each other. While such devices serve fairly well to prevent such inter-hooking of the bumper bars, they afford little or no protection to other exposed parts such as the lamps, the tail lights, and the modern low hung radiator and mud guards or fenders that overhang the wheels.

The main object of this invention has been to provide a novel protective accessory in the nature of a stout, rigid fender that may conveniently be mounted, preferably in pairs, on the usual bumper supporting bar slightly in rear of the bumper bar itself, and at such height and location as to protect the mud guards, tail lights (commonly mounted on the rear mud guards), and other exposed parts or accessories from injury by collision. Another object has been to provide an improved support for such a fender that will permit angular adjustment of the latter in a horizontal plane; and a further object has been to provide an improved fender and fender support that will afford easy vertical adjustment of the fender.

Other objects and attendant advantages of the invention will be apparent to persons familiar with the art to which the invention relates from the following detailed description, taken in connection with the accompanying drawing in which I have illustrated approved embodiments of the principle of the invention, and wherein—

Fig. 1 is a front elevation of an automobile showing my improved guard applied thereto.

Fig. 2 is an enlarged front elevation, partly in vertical section, showing the guard of Fig. 1 mounted on a limb of the bumper mounting bar.

Fig. 3 is a top plan view of Fig. 2, showing also an end portion of the bumper bar.

Fig. 4 is an end elevation of Fig. 3, viewed from the right, with the bumper bar and its mounting bar in vertical section.

Fig. 5 is a perspective detail of parts of the fender support that are clamped on the bumper mounting bar.

Fig. 6 is a bottom plan view of a saddle member that is seated on and secured to the clamp device shown in Fig. 5, with capacity of angular adjustment in a horizontal plane, and that directly carries the legs of the fender.

Figs. 7 and 8 are views similar to Figs. 2 and 3 respectively, showing on a reduced scale, slight modifications of the saddle and fender.

Fig. 9 is a view similar to Fig. 2, showing a modified form of clamp for engaging the bumper mounting bar and a modified form of fender.

Fig. 10 is a top plan view of Fig. 9.

Fig. 11 is a vertical section taken on the line 11—11 of Fig. 9.

Referring first to the form of the invention illustrated in Figs. 1 to 6 inclusive, the fender member is preferably, and as herein shown, bent to shape from a single length of 5/8" or 3/4" soft steel rod stock subsequently tempered, and comprises a horizontal loop-shaped head 12 and a pair of depending legs 13. The outer portion of the head 12 is preferably curved, as shown in Figs. 3 and 4, to conform approximately to the transverse curve of the mud guard in front of which it lies.

Engaged with the legs 13 is a fender support, herein shown as designed to be mounted on a limb of the usual bumper supporting bar 14 which, as shown in Fig. 3, is attached to the forward ends of the chassis side frame members 15 and at its ends is bolted or riveted to the end portions of the bumper bar 16 as shown at 17. The fender support comprises a clamp consisting of upper and lower blocks 18 and 19 and a saddle member 21 that seats on the upper block 18 and is secured to the latter with capacity of angular adjustment in a horizontal plane. The opposed ends of the clamp blocks 18 and 19 have transverse grooves 22 and 23 respectively that, as shown in Fig. 2, straddle the upper and lower edges of the bumper supporting bar 14, and are clamped on said bar by screws 24. The top face of the upper clamp block 18 is centrally tapped as shown at 25 and is formed with a radially toothed or ratcheted upper surface 26.

The saddle member 21 is formed with oppositely extending arms terminating in vertical sleeves 27 through which the legs 13 of the fender are passed and secured by clamp screws 28. The saddle member 21 is also formed on its under side with a centrally apertured and radially toothed or ratcheted seat 29 (Fig. 6) that fits down on the toothed or ratcheted face 26 of the clamp block 18, and is secured thereto by a screw 31. By backing off the screw 31 and raising the saddle 21 until the teeth 29 are disengaged from the teeth 26, the saddle member may be adjusted angularly as desired and then clamped in adjusted position.

The form illustrated in Figs. 7 and 8 differs from that of Figs. 1 to 6 inclusive, only in that the saddle member 21' is formed at its ends with horizontal sleeves 27', of which there may be two or more disposed in vertically spaced relation, and the legs of the fender are disposed horizontally and are secured in the sleeves 27' by nuts 32 engaged with threaded end portions of the fender legs. This construction more effectively supports the outer end portion of the fender against yielding backwardly under the impact of a blow; and also, when two or more vertically spaced pairs of sleeves 27' are provided, permits a limited vertical adjustment of the height of the fender above the bumper bar 16.

The form of the invention illustrated in Figs. 9, 10 and 11 employs a slightly different form of clamp for supporting the saddle member. The clamp in this case consists of an angle bracket 33 formed on its upper end with a toothed seat 26', its vertical limb having a shallow transverse groove 34 embracing one side of the bar 14, and a cooperating clamp plate 35 overlying the opposite side of the bar 14, with clamp bolts 36 securing the parts 33 and 35 together on the clamp bar 14. I have also shown engaged with this support a fender having a loop-shaped head 12' extending on the outer side only of its legs and conforming to the transverse curvature of the mud guard. This construction also permits angular adjustment in a horizontal plane of the fender on its support.

Two fender guards are preferably employed located respectively above and slightly in rear of the end portions of the bumper bar and in front of the ends of the mud guards, the fender guards obviously, by reason of their structure and position, being well adapted to both protect the ends of the bumper bar from inter-hooking with a colliding bumper bar, and protect the ends of the mud guards from injury.

One leg of the fender may conveniently serve to support a license plate bracket 37, as shown in Fig. 9.

The structural details may, of course, be varied within the scope of the appended claims.

I claim:

1. A protective device for automobiles, comprising a fender support and means for mounting the same on the bumper mounting bar, said support formed with a pair of horizontally spaced holes, a fender member having a head curved to approximately conform to the transverse curvature of an end of a wheel mud guard and legs engaged with said holes, and means for securing said legs in said holes with capacity of vertical adjustment.

2. A protective device for automobiles, comprising a fender support and means for mounting the same on the bumper mounting bar, said support including a member adjustable angularly in a horizontal plane, a fender member fixedly mounted on said angularly adjustable member, and means for locking said adjustable member against angular displacement from set position.

3. A protective device for automobiles, comprising a fender support and means for mounting the same on the bumper mounting bar and including a member adjustable angularly in a horizontal plane, said member being formed with spaced holes, a fender member having legs engaged with said holes, means for locking said angularly adjustable member in any adjusted position, and means for securing said legs in said holes with capacity of vertical adjustment.

4. A protective device for automobiles, comprising a fender support consisting of a pair of clamps shaped to embrace the bumper mounting bar, means for causing said clamps to hug said bar, and a saddle seated on the upper end of one of said clamps, said saddle being adjustable angularly in a horizontal plane and having spaced sleeves, and a fender member having legs mounted in said sleeves.

5. A protective device for automobiles, comprising a fender support consisting of a pair of clamps shaped to embrace the bumper mounting bar, means for causing said clamps to hug said bar, and a saddle seated on the upper end of one of said clamps, the contacting faces of said saddle and last-named clamp being formed with interlocking teeth, and said saddle having spaced sleeves, a screw securing said saddle on said clamp, and a fender member having legs mounted in said sleeves.

6. In a device of the class described, the combination with a bumper, a bumper mounting bar attached to the chassis side frame members, and a wheel mud guard, of a fender support and means for clamping the same on said mounting bar adjustably lengthwise of the latter, and a fender member mounted on said support and extending upwardly to a position in front of said mud guard.

ALLAN L. McGREGOR.